(12) United States Patent
Chi et al.

(10) Patent No.: US 11,529,564 B2
(45) Date of Patent: Dec. 20, 2022

(54) HAND STRAP AND HAND CONTROLLER ASSEMBLY

(71) Applicant: HTC Corporation, Taoyuan (TW)

(72) Inventors: Chia Hsiang Chi, Taoyuan (TW); Chang-Hua Wei, Taoyuan (TW); Yu Lin Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/467,451

(22) Filed: Sep. 7, 2021

(65) Prior Publication Data
US 2022/0118368 A1 Apr. 21, 2022

Related U.S. Application Data

(60) Provisional application No. 63/093,306, filed on Oct. 19, 2020.

(51) Int. Cl.
*A63F 13/98* (2014.01)
*F16G 11/04* (2006.01)
*A44B 11/10* (2006.01)
*A63F 13/211* (2014.01)

(52) U.S. Cl.
CPC ............. *A63F 13/98* (2014.09); *A44B 11/10* (2013.01); *F16G 11/04* (2013.01); *A63F 13/211* (2014.09)

(58) Field of Classification Search
CPC .......... A44B 11/10; F16G 11/04; A63F 13/98; Y10T 24/3969; Y10T 24/3996
USPC .......................................................... 463/47
See application file for complete search history.

(56) References Cited

U.S. PATENT DOCUMENTS

| 3,965,544 | A | * | 6/1976 | Boden | F16G 11/101 403/374.2 |
| 5,471,713 | A | * | 12/1995 | Alter | F16G 11/106 24/136 R |
| 5,894,639 | A | * | 4/1999 | Boden | F16G 11/106 24/115 M |
| 9,195,256 | B2 | | 11/2015 | Robbins et al. | |

(Continued)

FOREIGN PATENT DOCUMENTS

| CN | 101126434 | 7/2010 |
| CN | 102245110 | 11/2011 |
| TW | 201006522 | 2/2010 |

OTHER PUBLICATIONS

"Office Action of Taiwan Counterpart Application", dated Apr. 19, 2022, p. 1-p. 6.

*Primary Examiner* — Robert Sandy
(74) *Attorney, Agent, or Firm* — JCIPRNET (57) ABSTRACT

A hand strap and a hand controller assembly are provided. Two ends of the hand strap are respectively used for connecting a hand controller. The hand strap includes an elastic strap, a belt body, and a locking mechanism. The locking mechanism includes a fixed assembly and a sliding assembly. When a relative position of the fixed assembly and the sliding assembly is in a locked state, the fixed assembly and the sliding assembly clamp and fix the elastic strap. When the relative position of the fixed assembly and the sliding assembly is in an unlocked state, the fixed assembly and the sliding assembly release the elastic strap. When the elastic strap is not subjected to an external force, an elastic force of the elastic strap drives the relative position of the fixed assembly and the sliding assembly to be maintained in the locked state.

16 Claims, 8 Drawing Sheets

(56) References Cited

U.S. PATENT DOCUMENTS

| | | | | |
|---|---|---|---|---|
| 10,391,400 B1* | 8/2019 | Mucha | ............... | A63F 13/214 |
| 10,691,233 B2* | 6/2020 | Dalton | ............... | G06F 3/0383 |
| 10,874,939 B2* | 12/2020 | Nietfeld | ............... | B25J 13/02 |
| 10,898,796 B2* | 1/2021 | Hope | ............... | A63F 13/218 |
| 2019/0232160 A1 | 8/2019 | Hope et al. | | |
| 2020/0246691 A1 | 8/2020 | Petersen et al. | | |

\* cited by examiner

HAND STRAP AND HAND CONTROLLER ASSEMBLY

CROSS-REFERENCE TO RELATED APPLICATION

This application claims the priority benefit of U.S. Provisional Application No. 63/093,306, filed on Oct. 19, 2020. The entirety of the above-mentioned patent application is hereby incorporated by reference herein and made a part of this specification.

BACKGROUND

Technical Field

The disclosure relates to a hand strap and a hand controller assembly, and particularly, to a hand strap and a hand controller assembly that are easy to put on and take off.

Description of Related Art

Virtual reality (VR) technology is becoming more and more popular, and a common VR input device is a hand controller. To prevent dropping and breaking of the hand controller, a hand strap connected to the hand controller is generally fixed to the user's hand. When putting on and taking off the hand strap, the two hands are generally required to help each other. However, during the complicated operation of putting on and taking off the device, the hand controllers on the hands are likely to collide with each other and get damaged.

SUMMARY

The disclosure provides a hand strap and a hand controller assembly, which are suitable for solving the problem that the hand controllers are likely to collide with each other and get damaged.

A hand strap of the disclosure has two ends respectively adapted for coupling to a top and a bottom of a hand controller. The hand strap includes an elastic strap, a belt body, and a locking mechanism. The elastic strap is coupled to the bottom. The belt body has a first end and a second end opposite to each other. The first end is coupled to the top of the hand controller. The locking mechanism is disposed at the second end and coupled with the elastic strap. The belt body is coupled to the bottom via the locking mechanism and the elastic strap. The locking mechanism includes a fixed assembly and a sliding assembly. When a relative position of the fixed assembly and the sliding assembly is in a locked state, the fixed assembly and the sliding assembly clamp and fix the elastic strap. When the relative position of the fixed assembly and the sliding assembly is in an unlocked state, the fixed assembly and the sliding assembly release the elastic strap. When the elastic strap is not subjected to an external force, an elastic force of the elastic strap drives the relative position of the fixed assembly and the sliding assembly to be maintained in the locked state.

A hand controller assembly of the disclosure includes a hand controller and a hand strap. The hand controller has a top and a bottom opposite to each other. The hand strap has two ends respectively connecting to the hand controller. The hand strap includes an elastic strap, a belt body, and a locking mechanism. The elastic strap is coupled to the bottom. The belt body has a first end and a second end opposite to each other. The first end is coupled to the top of the hand controller. The locking mechanism is disposed at the second end and coupled with the elastic strap. The belt body is coupled to the bottom via the locking mechanism and the elastic strap. The locking mechanism includes a fixed assembly and a sliding assembly. When a relative position of the fixed assembly and the sliding assembly is in a locked state, the fixed assembly and the sliding assembly clamp and fix the elastic strap. When the relative position of the fixed assembly and the sliding assembly is in an unlocked state, the fixed assembly and the sliding assembly release the elastic strap. When the elastic strap is not subjected to an external force, an elastic force of the elastic strap drives the relative position of the fixed assembly and the sliding assembly to be maintained in the locked state.

Based on the above, when using the hand strap and hand controller assembly of the disclosure, the tightening operation may be performed simply by one hand tightening the elastic strap, and the unlocking operation may be performed simply by one hand operating the locking mechanism. Therefore, collision between the hand controllers can be reduced and damage can be avoided.

DESCRIPTION OF THE EMBODIMENTS

Figure 1:
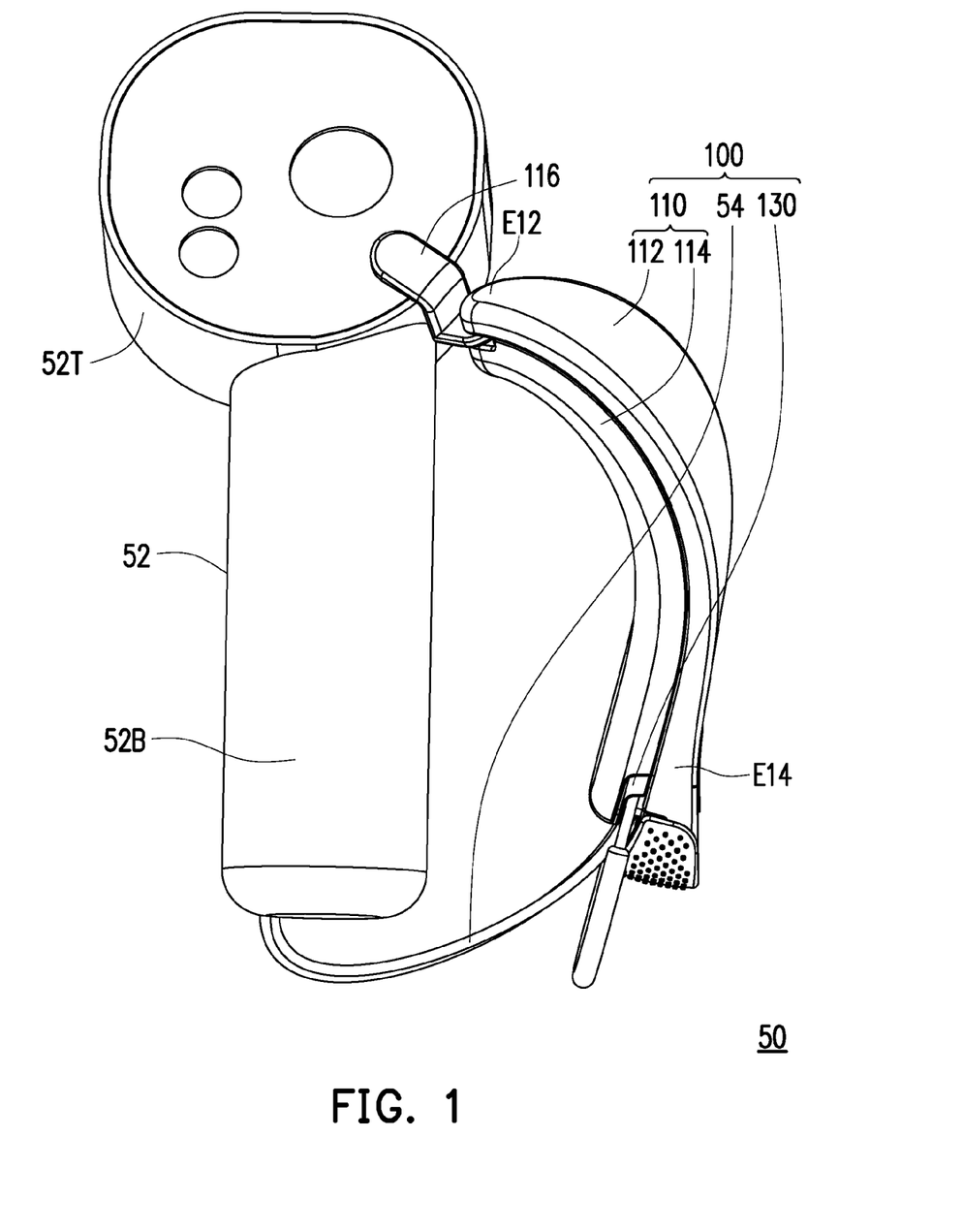
FIG. 1 is a schematic view of a hand controller assembly according to an embodiment of the disclosure.

FIG. 1 is a schematic view of a hand controller assembly according to an embodiment of the disclosure. Referring to FIG. 1, a hand controller assembly 50 of this embodiment includes a hand controller 52 and a hand strap 100. The hand controller 52 has a top 52T and a bottom 52B opposite to each other. The hand controller 52 is, for example, applied to a virtual reality system, an augmented reality system, a motion sensing game, or a game console. The virtual reality system includes the hand controller 52 and a host (not shown). The hand strap 100 is adapted to be worn on a user's hand, and the hand controller 52 is connected to the host in a wireless manner to transmit signals to and from the host. When the hand controller 52 is applied to the virtual reality system, the virtual reality system further includes a head-mounted display (not shown), which is adapted to be worn on the user' head and may also be connected to the host in a wired or wireless manner to transmit signals to and from the host. Alternatively, the hand controller 52 may also directly transmit signals to and from the head-mounted display.

Figure 2:
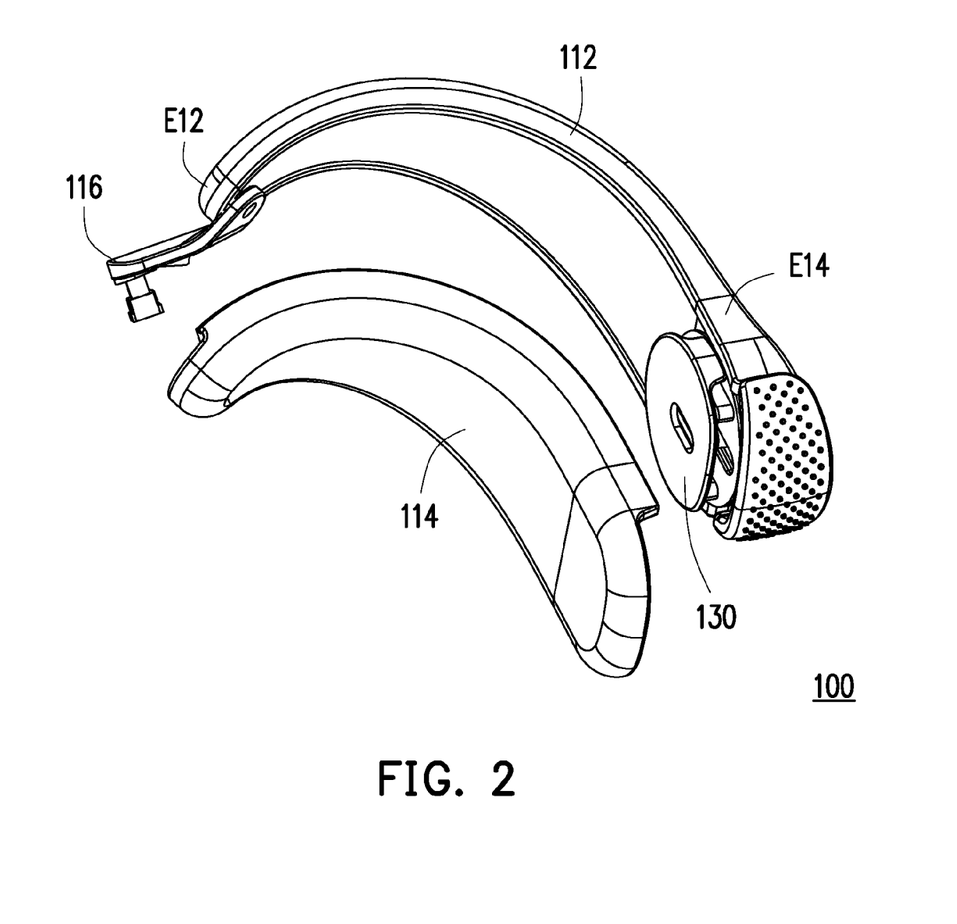
FIG. 2 is a schematic disassembled view of a hand strap according to an embodiment of the disclosure.

FIG. 2 is a schematic disassembled view of the hand strap according to an embodiment of the disclosure. Referring to FIG. 1 and FIG. 2, two ends of the hand strap 100 are respectively connected to the top 52T and the bottom 52B of the hand controller 52. The hand strap 100 includes an elastic strap 54, a belt body 110, and a locking mechanism 130. The elastic strap 54 is coupled to the bottom 52B of the hand controller 52. The belt body 110 has a first end E12 and a second end E14 opposite to each other. The first end E12 is coupled to the top 52T of the hand controller 52. The locking mechanism 130 is disposed at the second end E14 and is coupled with the elastic strap 54. The belt body 110 is coupled to the bottom 52B of the hand controller 52 via the locking mechanism 130 and the elastic strap 54.

Figure 3:
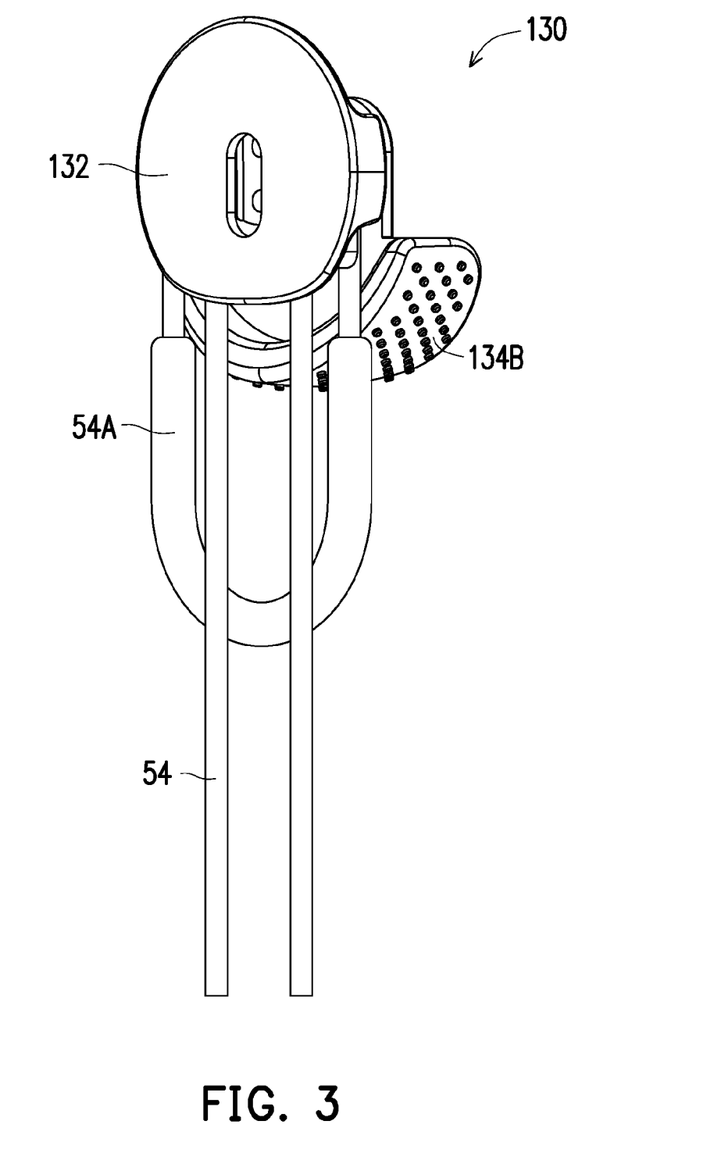
FIG. 3 is a schematic view of the connection between the hand strap and an elastic strap of the hand controller assembly of FIG. 1 in an unlocked state.
Figure 4:
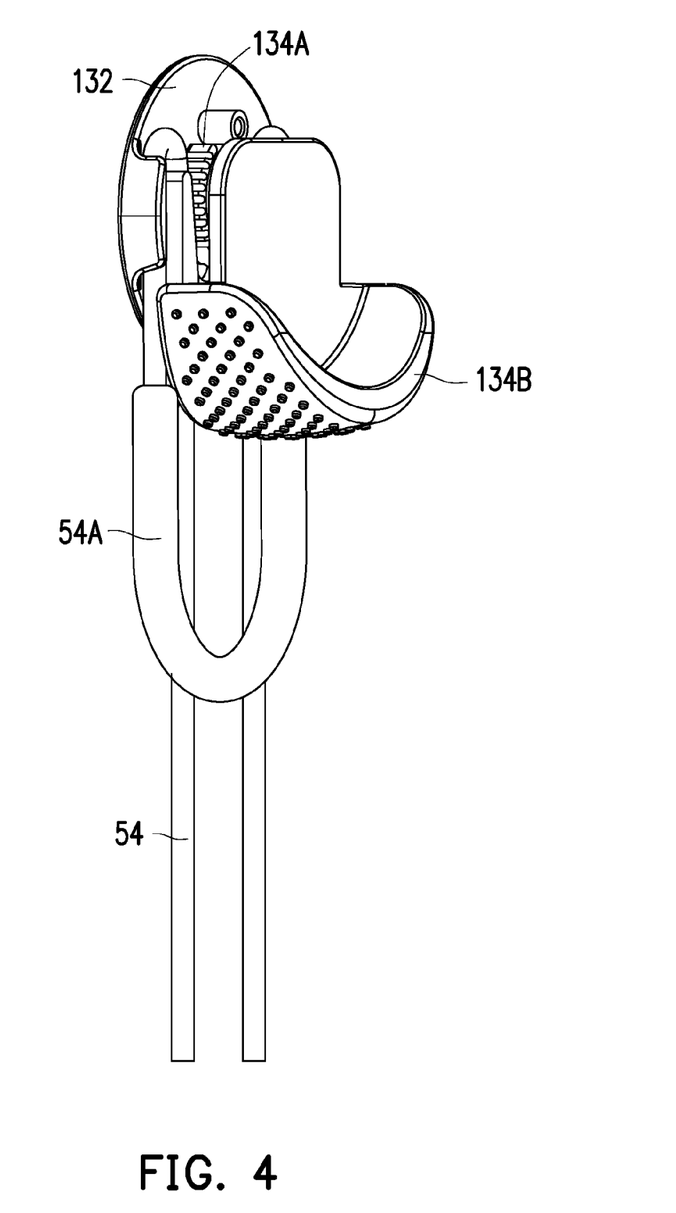
FIG. 4 is a schematic view of FIG. 3 from another viewing angle.
Figure 5:
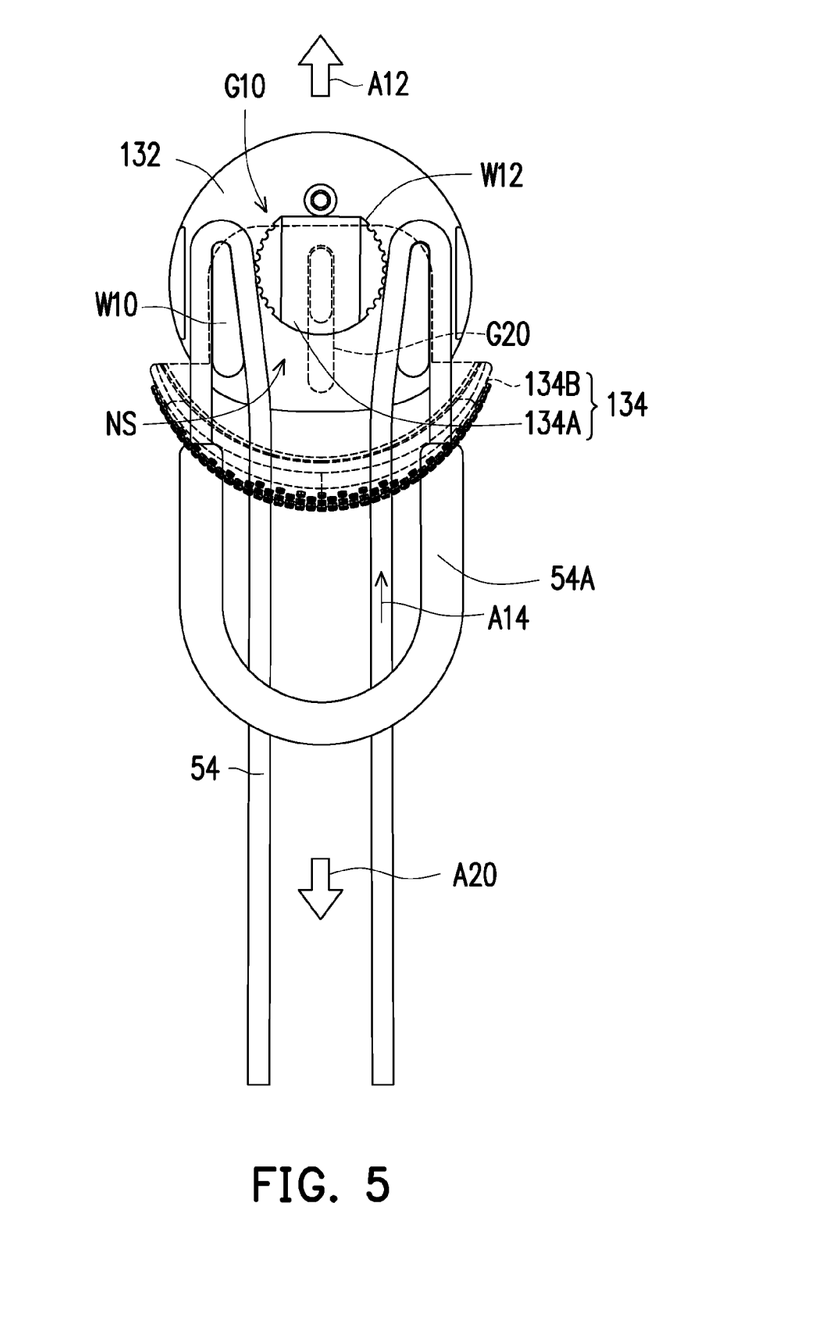
FIG. 5 is a schematic view showing some elements in FIG. 3 in a see-through manner.
Figure 6:
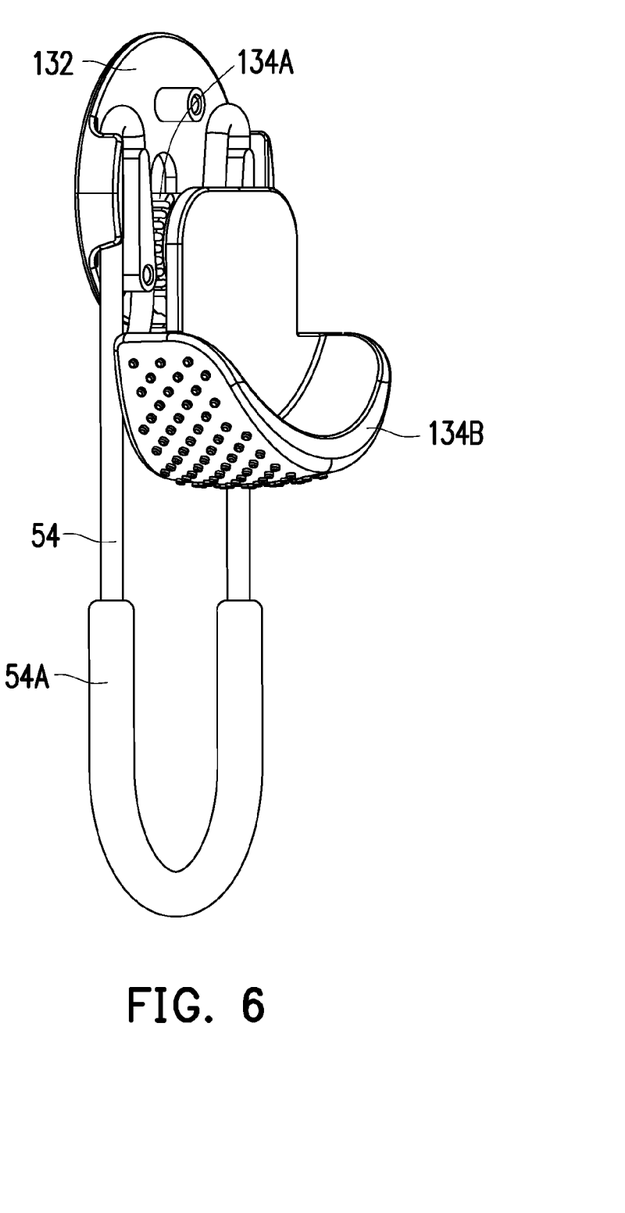
FIG. 6 is a schematic view of the connection between the hand strap and the elastic strap of the hand controller assembly of FIG. 1 in a locked state.
Figure 7:
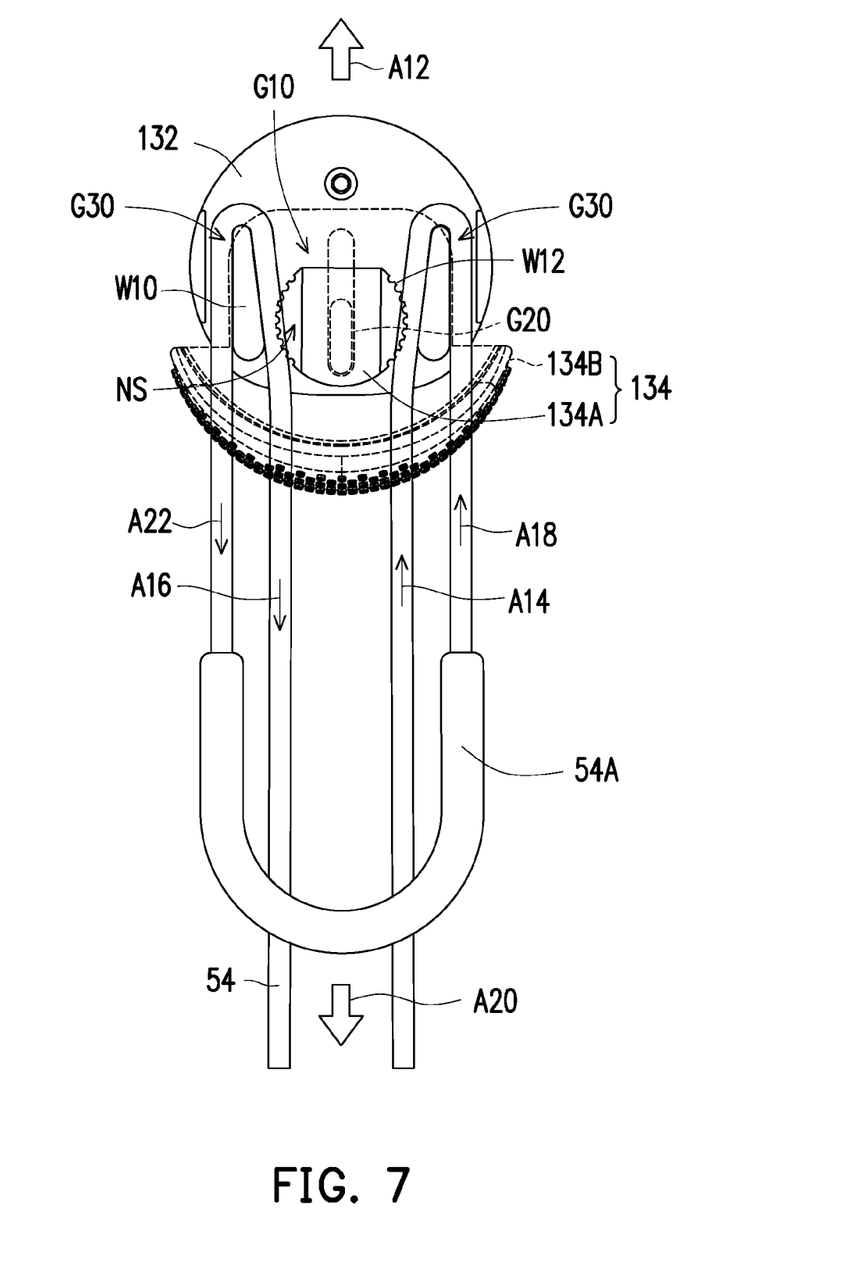
FIG. 7 is a schematic view showing some elements in FIG. 6 in a see-through manner.

FIG. 3 is a schematic view of the connection between the hand strap and the elastic strap of the hand controller assembly of FIG. 1 in an unlocked state. FIG. 4 is a schematic view of FIG. 3 from another viewing angle. FIG. 5 is a schematic view showing some elements in FIG. 3 in a see-through manner. Referring to FIG. 3 to FIG. 5, the locking mechanism 130 includes a fixed assembly 132 and a sliding assembly 134. When a relative position of the fixed assembly 132 and the sliding assembly 134 is in a locked state (as shown in FIG. 6 and FIG. 7), the fixed assembly 132 and the sliding assembly 134 clamp and fix the elastic strap 54. When the relative position of the fixed assembly 132 and the sliding assembly 134 is in an unlocked state (as shown in FIG. 3 to FIG. 5), the fixed assembly 132 and the sliding assembly 134 release the elastic strap 54. When the elastic strap 54 is not subjected to an external force, the elastic force of the elastic strap 54 drives the relative position of the fixed assembly 132 and the sliding assembly 134 to be maintained in the locked state.

Referring to FIG. 3 to FIG. 5 again, in this embodiment, the fixed assembly 132 has a wedge groove G10 and a guide groove G30 located on two sides of the wedge groove G10. The sliding assembly 134 includes a slider 134A and a push button 134B connected to the slider 134A. The wedge groove G10 has a narrow side NS and a wide side (not labeled) opposite to each other. The elastic strap 54 is located between the slider 134A and a sidewall W10 of the wedge groove G10. In the unlocked state as shown in FIG. 3 to FIG. 5, the slider 134A is away from the narrow side NS of the wedge groove G10. Therefore, the distance between the slider 134A and the sidewall W10 of the wedge groove G10 allows the elastic strap 54 to move relative to the fixed assembly 132.

FIG. 6 is a schematic view of the connection between the hand strap and the elastic strap of the hand controller assembly of FIG. 1 in a locked state. FIG. 7 is a schematic view showing some elements in FIG. 6 in a see-through manner. Referring to FIG. 6 and FIG. 7, in this embodiment, in the locked state, the slider 134A is located on the narrow side NS of the wedge groove G10. Therefore, the distance between the slider 134A and the sidewall W10 of the wedge groove G10 is small, so that the elastic strap 54 is tightly clamped and cannot move relative to the fixed assembly 132. The elastic strap 54 is located in the wedge groove G10 and the guide groove G30; namely, the elastic strap 54 passes through the wedge groove G10 and the guide groove G30. The slider 134A is disposed in the wedge groove G10. The elastic strap 54 is located in the wedge groove G10 and between the slider 134A and the fixed assembly 132.

For example, when the user wants to release the hand strap 100 fixed on the right hand, he or she only needs to push the push button 134B with the palm of his or her left hand. More specifically, when the push button 134B is subjected to an external force to drive the slider 134A in the direction of an arrow A12 from the narrow side NS of the wedge groove G10 to move away from the narrow side NS of the wedge groove G10, the relative position of the fixed assembly 132 and the sliding assembly 134 is switched from the locked state of FIG. 7 to the unlocked state of FIG. 5, and the elastic strap 54 slides via the guide groove G30 toward the wedge groove G10 to enter the locking mechanism 130 and slides outward via the wedge groove G10 to move away from the locking mechanism 130; namely, the elastic strap 54 slides in the direction of an arrow A16. In the unlocked state as shown in FIG. 5, the elastic strap 54 may be used to adjust the distance between the second end E14 of the belt body 110 and the bottom 52B of the hand controller 52 to increase the space between the belt body 110 and the hand controller 52 and make it easy to separate the hand from the hand controller 52.

When the user wants to fasten the hand strap 100 on the right hand, he or she only needs to pull a force application end 54A of the elastic strap 54 with his or her left hand until the hand strap 100 fixes the right palm. More specifically, the force application end 54A of the elastic strap 54 is pulled, so that due to an external force, the elastic strap 54 is slid into the locking mechanism 130 via the wedge groove G10 in the direction of an arrow A14, and is pulled out of the locking mechanism 130 via the guide groove G30 in the direction of an arrow A22. At the same time, the elastic strap 54 drives the slider 134A to move from the narrow side NS of the wedge groove G10 in the direction of the arrow A12 to move away from the narrow side NS of the wedge groove G10, and the relative position of the fixed assembly 132 and the sliding assembly 134 is switched from the locked state of FIG. 7 to the unlocked state of FIG. 5. Therefore, the tightness of the hand strap 100 can be adjusted by simply pulling the elastic strap 54.

When the external force is released, due to its elastic restoring force, the elastic strap 54 slides into the locking mechanism 130 via the guide groove G30 in the direction of an arrow A18 and drives the slider 134A to move from away from the narrow side NS of the wedge groove G10 toward the narrow side NS of the wedge groove G10 in the direction of the arrow A20, and the relative position of the fixed assembly 132 and the sliding assembly 134 is switched from the unlocked state of FIG. 5 to the locked state of FIG. 7. At this time, the slider 134A reaches the narrow side NS of the wedge groove G10, so the elastic strap 54 can be clamped by the slider 134A and the wedge groove G10 to prevent the distance between the second end E14 of the belt body 110 and the bottom 52B of the hand controller 52 from changing. Accordingly, the hand strap 100 can be kept fastened on the palm of the user, so that the hand controller 52 can be held stably by the user's hand. In other words, when the user finishes adjusting the tightness of the hand strap 100, the user only needs to release the elastic strap 54, and the elastic strap 54 automatically switches the relative position of the fixed assembly 132 and the sliding assembly 134 from the unlocked state of FIG. 5 to the locked state of FIG. 7.

Figure 8:
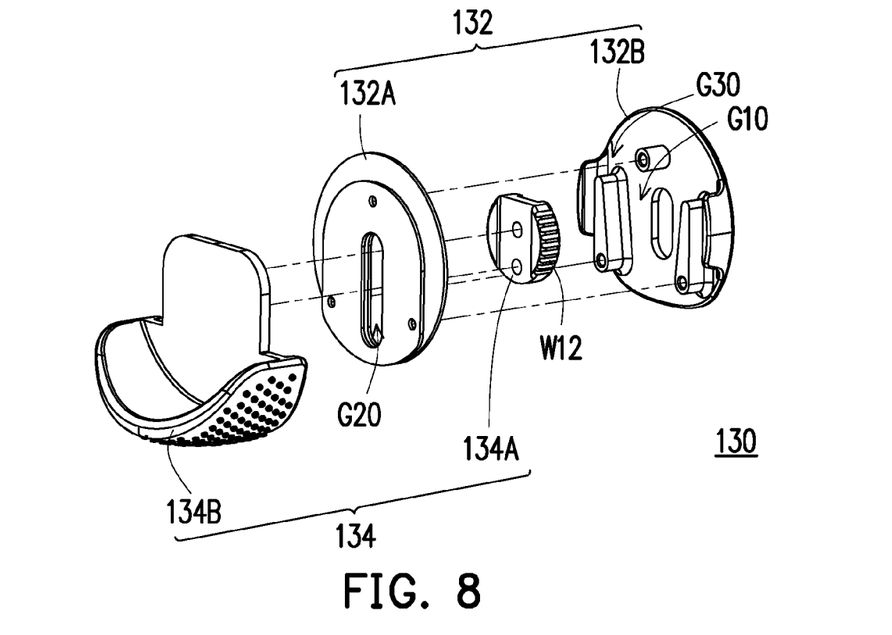
FIG. 8 is a schematic exploded view of some elements of FIG. 3.
Figure 9:
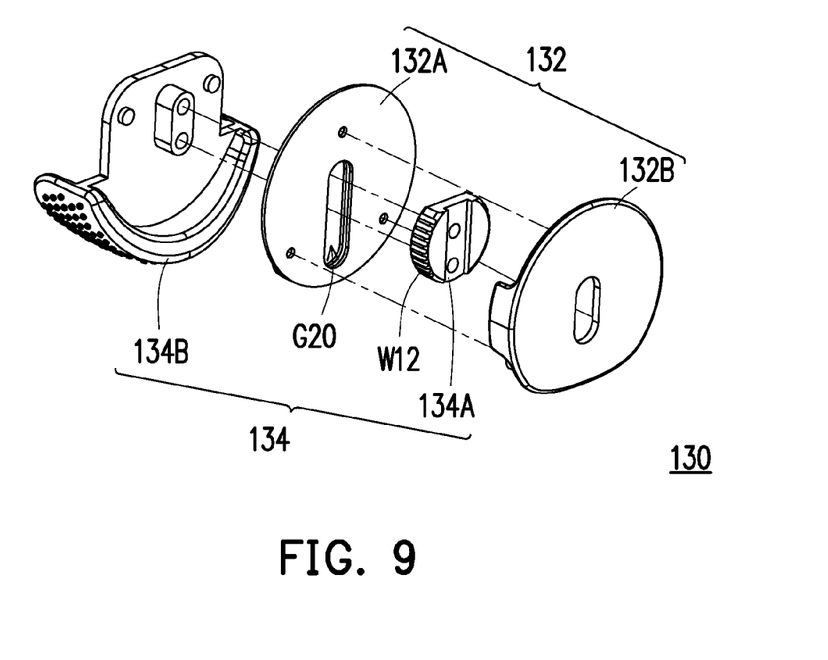
FIG. 9 is a schematic exploded view of some elements of FIG. 4.

FIG. 8 is a schematic exploded view of some elements of FIG. 3. FIG. 9 is a schematic exploded view of some elements of FIG. 4. Referring to FIG. 8 and FIG. 9, in this embodiment, the sidewall of the slider 134A is provided with engaging teeth W12 for contacting the elastic strap 54 and clamping and fixing the elastic strap 54 with the fixed assembly 132. In the locked state, the engaging teeth W12 may further increase the friction and prevent the elastic strap 54 from moving relative to the fixed assembly 132.

In this embodiment, the fixed assembly 132 may include a first fixed member 132A and a second fixed member 132B. The first fixed member 132A has a strip-shaped through-hole G20. The slider 134A and the push button 134B are connected to each other via the strip-shaped through-hole G20, and the slider 134A is adapted to move along the strip-shaped through-hole G20. The second fixed member 132B and the first fixed member 132A enclose the wedge groove G10 and the guide groove G30.

Referring to FIG. 5, in this embodiment, the elastic strap 54 has elasticity, and the elastic strap 54 has the force application end 54A. After the user wears the hand controller assembly 50 on the palm of his or her hand, he or she may apply a force to the force application end 54A to move the elastic strap 54 in the direction of the arrow A14. At this time, the elastic strap 54 drives the slider 134A away from the narrow side NS of the wedge groove G10 in the direction of the arrow A12, so the elastic strap 54 can be pulled to decrease the distance between the second end E14 of the belt body 110 and the bottom 52B of the hand controller 52 to bring the belt body 110 close to the back of the user's hand.

Referring to FIG. 7, when the user stops applying force to the force application end 54A, the elastic restoring force of the elastic strap 54 drives the slider 134A to move toward the narrow side NS of the wedge groove G10 in the direction of the arrow A20. At this time, the elastic strap 54 is fixed. Therefore, the distance between the second end E14 of the belt body 110 and the bottom 52B of the hand controller 52 is fixed, so that the hand controller 52 can be stably grasped by the user's hand. In other words, the palm of the user's hand may pass between the belt body 110 and the hand controller 52 and the hand strap 100 is fastened. Therefore, when the user is using the hand controller 52, even if the palm is opened, the hand controller 52 does not drop easily.

In this embodiment, the belt body 110 includes, for example, a first sub-belt body 112 and a second sub-belt body 114, and the second sub-belt body 114 is detachably assembled to the first sub-belt body 112. For example, the material of the first sub-belt body 112 and the second sub-belt body 114 may be a foam. Therefore, when the hand strap 100 is not fastened, the first sub-belt body 112 and the second sub-belt body 114 made of a foam may substantially maintain their shapes to provide an arc-shaped space for the user's palm to pass between the hand strap 100 and the hand controller 52. In addition, when the second sub-belt body 114 is removed, the user may also perform washing or disinfection procedures on the second sub-belt body 114. In this embodiment, the hand strap 100 may also be detachably connected to the top 52T of the hand controller 52, so the user may replace the hand strap 100 by himself or herself. In other embodiments, the hand strap 100 may also be fixed to the top 52T of the hand controller 52.

The belt body 110 of this embodiment may further include a metal piece 116 disposed on the first sub-belt body 112. The first sub-belt body 112 is coupled to the top 52T of the hand controller 52 via the metal piece 116. The metal piece 116 and the hand controller 52 may be fixedly, detachably, rotatably, and/or slidably coupled to each other.

In this embodiment, the locking mechanism 130 may be assembled to the first sub-belt body 112. One sides of the first sub-belt body 112 and the second sub-belt body 114 are collectively connected to the top 52T of the hand controller 52, and another side of the second sub-belt body 114 covers the locking mechanism 130 assembled to the first sub-belt body 112. An arc-shaped space is formed between the belt body 110 and the hand controller 52 for the palm of the user to pass through.

In summary of the above, in the hand controller assembly and the hand strap thereof of this embodiment, the user can adjust the tightness of the hand strap by simply pulling the elastic strap. When the user releases the elastic strap, the locking mechanism will enter the locked state. Therefore, the hand controller assembly can be secured on the palm of the user, and even if the palm is opened, the hand controller does not drop easily. When the user wants to take off the hand controller assembly, the user only needs to push the push button of the locking mechanism to release the hand strap, and the user's palm can be separated from the hand controller assembly. Since the above operation is simple and may be performed with one hand, it is possible to greatly reduce the possibility of collision between the hand controllers or fall of the hand controller during the operation and thereby avoid damage.

What is claimed is:

1. A hand strap, having two ends respectively adapted for coupling to a top and a bottom of a hand controller, the hand strap comprising:
    an elastic strap coupled to the bottom;
    a belt body having a first end and a second end opposite to each other, wherein the first end is coupled to the top of the hand controller; and
    a locking mechanism disposed at the second end and coupled with the elastic strap, wherein the belt body is coupled to the bottom via the locking mechanism and the elastic strap, and the locking mechanism comprises:
        a fixed assembly; and
        a sliding assembly, wherein when a relative position of the fixed assembly and the sliding assembly is in a locked state, the fixed assembly and the sliding assembly clamp and fix the elastic strap; when the relative position of the fixed assembly and the sliding assembly is in an unlocked state, the fixed assembly and the sliding assembly release the elastic strap; and when the elastic strap is not subjected to an external force, an elastic force of the elastic strap drives the relative position of the fixed assembly and the sliding assembly to be maintained in the locked state.

2. The hand strap according to claim 1, wherein the fixed assembly has a wedge groove and a guide groove located on two sides of the wedge groove, the elastic strap is located in the wedge groove and the guide groove, the sliding assembly comprises a slider and a push button connected to the slider, the slider is disposed in the wedge groove, and the elastic strap is located in the wedge groove and between the slider and the fixed assembly, wherein when the push button is subjected to an external force and drives the slider to move from a narrow side of the wedge groove in a direction away from the narrow side of the wedge groove, the relative position of the fixed assembly and the sliding assembly is switched from the locked state to the unlocked state, and the elastic strap enters the locking mechanism via the guide groove and moves away from the locking mechanism via the wedge groove.

3. The hand strap according to claim 2, wherein the elastic strap is subjected to an external force and enters the locking mechanism via the wedge groove and is pulled out of the locking mechanism via the guide groove, the elastic strap drives the slider to move from the narrow side of the wedge groove in a direction away from the narrow side of the wedge groove, and the relative position of the fixed assembly and the sliding assembly is switched from the locked state to the unlocked state, wherein when the external force is released, the elastic strap enters the locking mechanism via the guide groove and drives the slider to move from away from the narrow side of the wedge groove toward the narrow side of the wedge groove, and the relative position of the fixed assembly and the sliding assembly is switched from the unlocked state to the locked state.

4. The hand strap according to claim 2, wherein the slider is provided with engaging teeth for clamping and fixing the elastic strap with the fixed assembly.

5. The hand strap according to claim 2, wherein the fixed assembly comprises:
   a first fixed member having a strip-shaped through-hole, wherein the slider and the push button are connected to each other via the strip-shaped through-hole, and the slider is adapted to move along the strip-shaped through-hole; and
   a second fixed member, wherein the second fixed member and the first fixed member enclose the wedge groove and the guide groove.

6. The hand strap according to claim 1, wherein the belt body comprises:
   a first sub-belt body; and
   a second sub-belt body detachably assembled to the first sub-belt body, wherein the locking mechanism is assembled to the first sub-belt body.

7. The hand strap according to claim 6, wherein the belt body further comprises a metal piece disposed on the first sub-belt body, and the first sub-belt body is coupled to the top of the hand controller via the metal piece.

8. The hand strap according to claim 6, wherein a main material of the first sub-belt body and the second sub-belt body is a foam.

9. A hand controller assembly comprising:
   a hand controller having a top and a bottom opposite to each other; and
   a hand strap, having two ends respectively adapted for connecting to the hand controller, the hand strap comprising:
      an elastic strap coupled to the bottom;
      a belt body having a first end and a second end opposite to each other, wherein the first end is coupled to the top of the hand controller; and
      a locking mechanism disposed at the second end and coupled with the elastic strap, wherein the belt body is coupled to the bottom via the locking mechanism and the elastic strap, and the locking mechanism comprises:
         a fixed assembly; and
         a sliding assembly, wherein when a relative position of the fixed assembly and the sliding assembly is in a locked state, the fixed assembly and the sliding assembly clamp and fix the elastic strap; when the relative position of the fixed assembly and the sliding assembly is in an unlocked state, the fixed assembly and the sliding assembly release the elastic strap; and when the elastic strap is not subjected to an external force, an elastic force of the elastic strap drives the relative position of the fixed assembly and the sliding assembly to be maintained in the locked state.

10. The hand controller assembly according to claim 9, wherein the fixed assembly has a wedge groove and a guide groove located on two sides of the wedge groove, the elastic strap is located in the wedge groove and the guide groove, the sliding assembly comprises a slider and a push button connected to the slider, the slider is disposed in the wedge groove, and the elastic strap is located in the wedge groove and between the slider and the fixed assembly, wherein when the push button is subjected to an external force and drives the slider to move from a narrow side of the wedge groove in a direction away from the narrow side of the wedge groove, the relative position of the fixed assembly and the sliding assembly is switched from the locked state to the unlocked state, and the elastic strap enters the locking mechanism via the guide groove and moves away from the locking mechanism via the wedge groove.

11. The hand controller assembly according to claim 10, wherein the elastic strap is subjected to an external force and enters the locking mechanism via the wedge groove and is pulled out of the locking mechanism via the guide groove, the elastic strap drives the slider to move from the narrow side of the wedge groove in a direction away from the narrow side of the wedge groove, and the relative position of the fixed assembly and the sliding assembly is switched from the locked state to the unlocked state, wherein when the external force is released, the elastic strap enters the locking mechanism via the guide groove and drives the slider to move from away from the narrow side of the wedge groove toward the narrow side of the wedge groove, and the relative position of the fixed assembly and the sliding assembly is switched from the unlocked state to the locked state.

12. The hand controller assembly according to claim 10, wherein the slider is provided with engaging teeth for clamping and fixing the elastic strap with the fixed assembly.

13. The hand controller assembly according to claim 10, wherein the fixed assembly comprises:
   a first fixed member having a strip-shaped through-hole, wherein the slider and the push button are connected to each other via the strip-shaped through-hole, and the slider is adapted to move along the strip-shaped through-hole; and
   a second fixed member, wherein the second fixed member and the first fixed member enclose the wedge groove and the guide groove.

14. The hand controller assembly according to claim 9, wherein the belt body comprises:
   a first sub-belt body; and
   a second sub-belt body detachably assembled to the first sub-belt body, wherein the locking mechanism is assembled to the first sub-belt body.

15. The hand controller assembly according to claim 14, wherein the belt body further comprises a metal piece disposed on the first sub-belt body, and the first sub-belt body is coupled to the top of the hand controller via the metal piece.

16. The hand controller assembly according to claim 14, wherein a main material of the first sub-belt body and the second sub-belt body is a foam.

\* \* \* \* \*